United States Patent [19]
Tai et al.

[11] Patent Number: 5,359,691
[45] Date of Patent: Oct. 25, 1994

[54] BACKLIGHTING SYSTEM WITH A MULTI-REFLECTION LIGHT INJECTION SYSTEM AND USING MICROPRISMS

[75] Inventors: Chen-Yu Tai; Han Zou, both of Toledo, Ohio

[73] Assignee: Briteview Technologies, Toledo, Ohio

[21] Appl. No.: 49,509

[22] Filed: Apr. 19, 1993

Related U.S. Application Data

[63] Continuation-in-part of Ser. No. 958,238, Oct. 8, 1992.

[51] Int. Cl.$^5$ .............................................. G02B 6/04
[52] U.S. Cl. ........................................ 385/146; 362/32
[58] Field of Search ................................ 385/115–119, 385/900, 901; 362/32, 31, 26, 330, 806; 358/901

[56] References Cited

U.S. PATENT DOCUMENTS

| | | | |
|---|---|---|---|
| 4,917,465 | 4/1990 | Conner et al. | 350/335 |
| 5,050,946 | 9/1991 | Hathaway et al. | 385/33 |
| 5,187,765 | 2/1993 | Muehlemann et al. | 385/901 X |
| 5,202,950 | 4/1993 | Arego et al. | 385/901 X |
| 5,226,105 | 7/1993 | Myers | 385/901 X |

*Primary Examiner*—Akm E. Ullah
*Attorney, Agent, or Firm*—Gray Cary Ware & Freidenrich

[57] ABSTRACT

An assembly for backlighting a liquid crystal flat panel display or other such arrangement requiring backlighting is disclosed herein. The assembly is composed of a multi-reflection light injection system, a light pipe and a set of specifically configured microprisms which, cooperating with the light pipe, provides an efficient backlighting technique with a controllable degree of collimation. The disclosed assembly may employ up to four light sources to give a brighter backlighting.

30 Claims, 10 Drawing Sheets

BACKLIGHTING SYSTEM WITH A MULTI-REFLECTION LIGHT INJECTION SYSTEM AND USING MICROPRISMS

CROSS REFERENCE TO RELATED APPLICATIONS

This application is a continuation-in-part of copending application Ser. No. 07/958,238, filed Oct. 8, 1992 now is being allowed which is incorporated herein by reference.

BACKGROUND OF THE INVENTION

1. Field of the Invention

The present invention relates generally to a backlighting system especially suitable for use with liquid crystal displays. In particular, it contains certain improved features of a backlighting system of the type disclosed in the above-recited copending application.

2. Description of the Related Art

Liquid crystal displays (LCDs) are commonly used in portable computer systems, televisions, and other electronic display devices. Large area, high performance LCDs require a source of lighting for operation. Backlighting the LCD has become the most popular source of light in personal computers, televisions, as well as projector type displays. In general, there is a need to obtain a sufficiently bright backlighting with as little power consumption as possible. Backlighting systems with a specified degree of collimating, that is, a limited divergence angle is necessary for such configurations as three cell stacked assembly (TSTN). Since most LCDs have very low transmission and view-angle dependent characteristics, it is sometimes desirable to use more than one light source efficiently for brighter picture presentation. As an example, transmission of a color active matrix LCD is only about 2% and a hot cathode fluorescent lamp, which consumes significantly more energy than a cold cathode fluorescent lamp, is often needed for its back lighting. With the backlighting assembly designed in accordance with the present invention, efficiency in converting light from a linear diffuse light source to a flat display panel, such as LCD, can be significantly improved. This invention can therefore prolong the life time of a battery powering a portable LCD display. Uniformity of the backlighting as well as small space for convenience of portability are also achieved with the present invention.

In most of the existing backlighting systems, the mechanism that brings light out of the light pipe is based on the principal of random scattering which is not only wavelength dependent, but also not very efficient. In addition, this approach can not provide collimated backlighting which is needed for use in applications like stacked liquid crystal displays to avoid parallax effect. Although some approaches have been proposed to obtain collimated backlighting for such displays, they all need a point light source and an optical system based on lenses and mirrors. Since a point light source currently available is generally less power-efficient than a fluorescent lamp and in most cases requires a cooling system such as a fan, and optical systems based on lenses and mirrors which take up a large space, techniques for highly collimated light sources presented before were not practical for the backlighting of portable computers and flat television sets. For this reason, the stacked panel technology is limited to projector type display at this moment.

As will be seen hereinafter, with the backlighting assembly designed in accordance with the present invention, a compact and power-saving light source, which can provide backlighting of both high intensity and controllable collimation, may be applied to stacked panel displays, colored displays in portable computers as well as real time flat displays.

SUMMARY OF THE INVENTION

As will be described in more detail hereinafter, an assembly for backlighting a liquid crystal display is disclosed herein. The assembly includes a generally rectangular backlighting light pipe having opposing top and bottom surfaces, two pairs of opposing sides, means for directing light into the light pipe from one or more sides and causing it to move from one end of the light pipe towards the opposite end thereof, and an arrangement of immediately adjacent pyramid or triangle microprisms serving as the bottom surface of the light pipe. The microprisms are designed in accordance with a number of embodiments of the present invention to reflect light within the light pipe upwards through its top surface.

In one embodiment of the backlighting assembly disclosed herein, two linear light sources are coupled to the light pipe at two adjacent sides of the light pipe by means of light collimating assemblies extending parallel to their respective linear light sources. As will be seen, each light collimating assembly can collimate light, to a certain degree, in the plane perpendicular to the surface of the light pipe by means of multi-reflections inside the collimating assembly. There is also disclosed herein a backlighting assembly designed in accordance with a second embodiment. In this embodiment, the light collimating assembly is divided into a series of longitudinally extending laterally adjacent sections or channels which extend from the input end of the light collimating assembly to its output end and which are optically isolated from one another along substantially their entire lengths, whereby the individual light pipe sections act on incoming light substantially independent of one another. As will be seen, this multichannel configuration allows for the use of a linear light source to achieve two dimensional collimation of light exiting the assembly. In a third and a fourth embodiment of the backlighting assembly, only one linear light source is employed. Such systems can provide sufficient backlighting for applications needs less intense backlighting such as monochromatic LCDs or color STN LCDs. As can be seen, up to four light sources can be used if extremely intense backlighting is needed.

While the present invention provides for a number of unique backlighting assemblies, it also provides for a unique system which includes a backlighting assembly in combination with a liquid crystal display and a specifically designed light polarizing arrangement which, in combination with the backlighting assembly, ensures that substantially all of the light from the backlighting assembly for use by the liquid crystal display is appropriately polarized. This is to be contrasted with prior art polarization schemes in which only at most about one half of the available light from the backlighting assembly is properly polarized. In the particular embodiment disclosed herein, the polarizing arrangement utilizes a retroreflecting sheet polarizer in cooperation with the microprisms forming part of the backlighting assembly to provide the appropriate polarization of light exiting the backlighting assembly.

Other features of the present invention will be apparent hereinafter, including the ability to provide a liquid crystal display that can be viewed from wide angles without picture degradation.

DESCRIPTION OF THE DRAWINGS

The present invention will be described in more detail hereafter in conjunction with the drawings, wherein.

DETAILED DESCRIPTION OF THE PREFERRED EMBODIMENT

Figure 1:
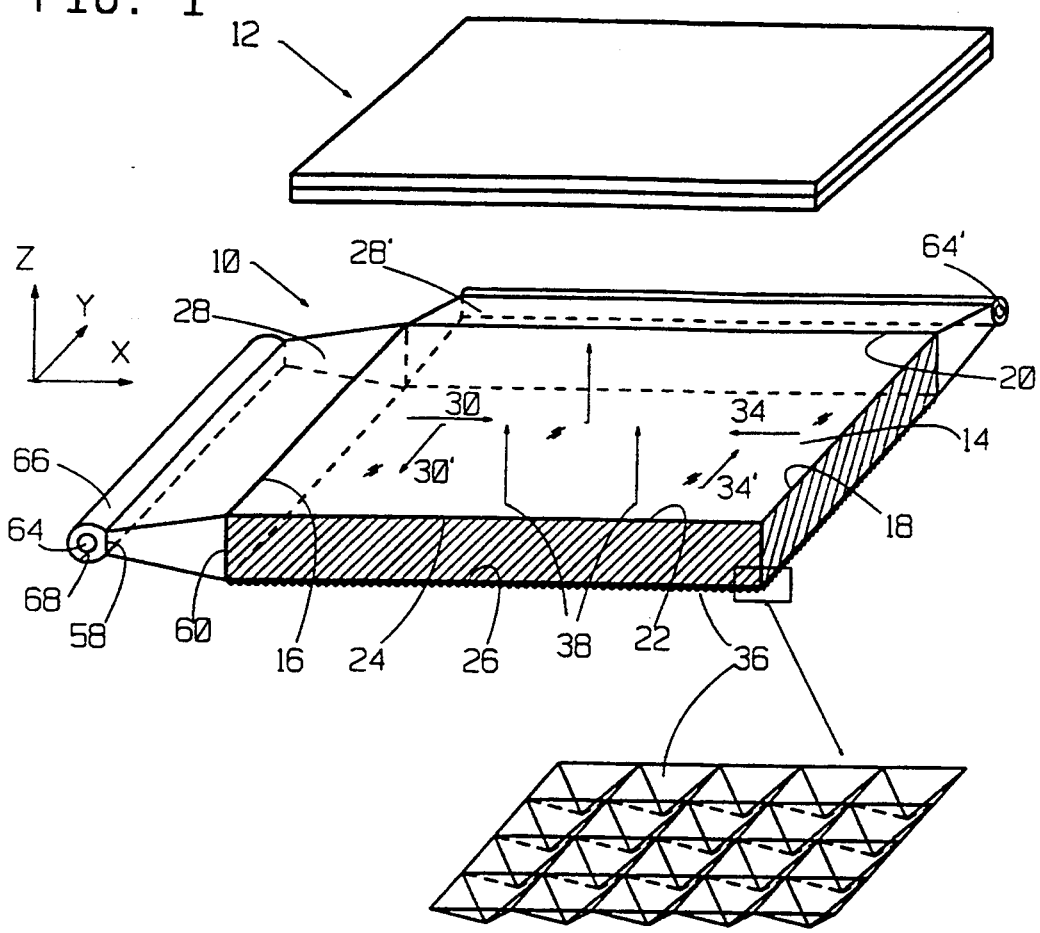
FIG. 1 is a perspective view of a backlighting assembly which is designed in accordance with one embodiment of the present invention and which is shown in combination with a liquid crystal display, the backlighting assembly being shown in an x, y, z coordinate system for purpose of convenience.

Turning now to the drawings, wherein like components are designed by like reference numerals throughout the various figures, attention is first directed to FIG. 1. As indicated above, this figure illustrates in perspective view an assembly designed in accordance with the present invention for backlighting a liquid crystal display. The assembly is shown at 10 within an x-y-z coordinate system, and the liquid crystal display is generally indicated by the reference number 12. Assembly 10 includes a generally rectangular backlighting light pipe 14 which extends in both the x-direction and y-direction, between opposite ends 16 and 18, and opposing sides or ends 20 and 22 and which has opposing top and bottom surfaces 24 and 26, respectively, extending horizontally (in the x-y plane). Two light collimating assemblies or arrangements generally indicated as 28 and 28', respectively, are provided for directing light into the light pipe at adjacent entry ends 16 and 20, and for causing the light to move from entry ends 16 and 20 towards the opposite ends 18 and 22, as indicated generally by arrows 30 and 30'. Ends 18 and 22 include light reflecting surfaces, respectively, for reflecting light back towards entry ends 16 and 20, as indicated generally by arrows 34 and 34'.

Figure 3:
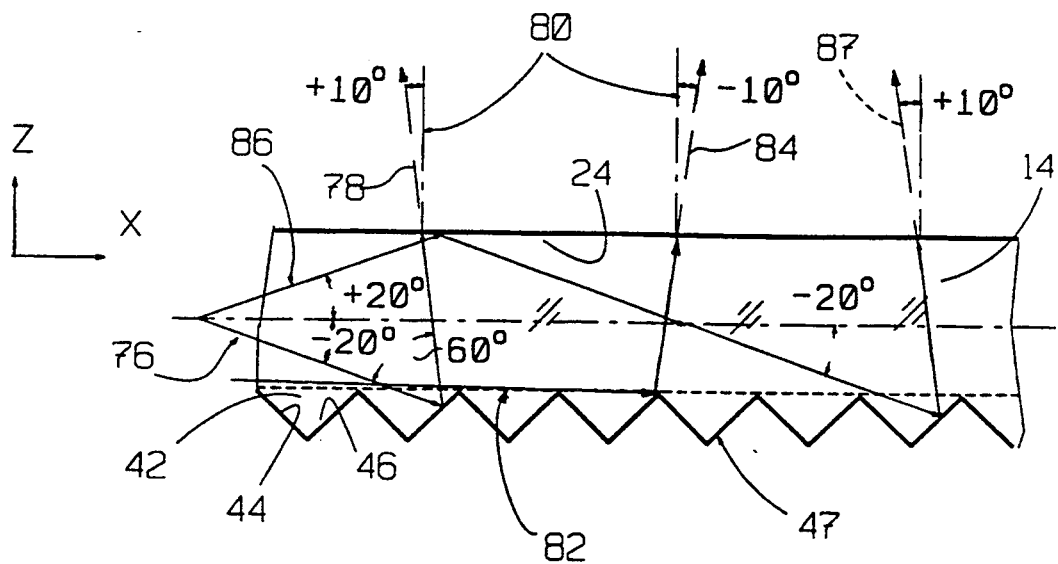
FIG. 3 is a section view of a portion of a backlighting pipe forming part of the backlighting assembly of FIG. 1, specifically illustrating the way in which light enters and exits the light pipe in cooperation with a sheet of pyramid prisms designed in accordance with the present invention.
Figure 9A:
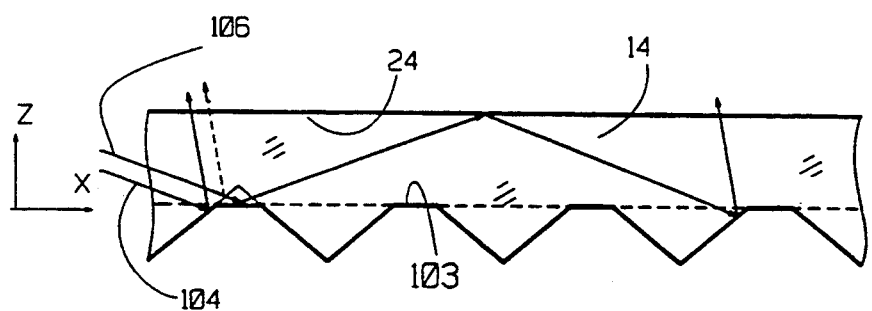
FIG. 9A is a sectional view of a portion of a backlighting pipe of the present invention employing the modified sheet of pyramid microprisms in FIG. 8, especially illustrating the way in which light enters, propagates through and exits light pipe.
Figure 9B:
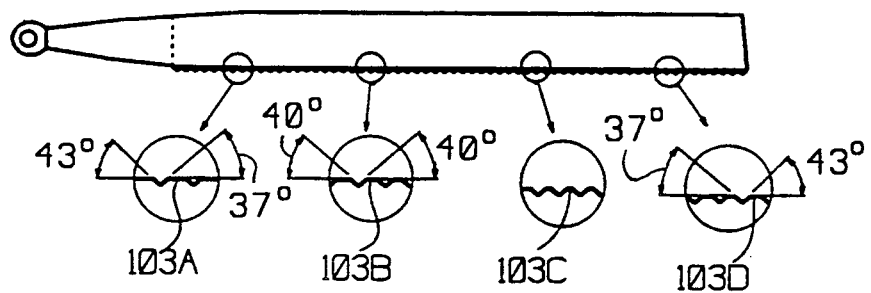
FIG. 9B is a diagrammatic illustration, in side elevation, of a modified backlighting assembly designed in accordance with the present invention.

Still referring to FIG. 1, backlighting assembly 10 also includes an arrangement 36 of immediately adjacent downwardly pointing pyramid shaped microprisms or merely pyramid microprisms, as they will also be referred to, extending in the x-y plane along the entire extent of and serving as the bottom surface of light pipe 14. Note that the base of each microprism is immediately adjacent to and in a common plane with the adjacent pyramid prisms, and that the common plane is parallel with the x-y axes. In the particular embodiment illustrated in FIG. 1, each of the microprisms, which is generally indicated at 42 in FIG. 3, is a regular, four-sided pyramid having a rectangular base and four triangular (isosceles) light reflecting sides, a first opposing pair of which reflects incident light from the x-direction and the second opposing pair of which reflects incident light from the y-direction. One pair of opposing sides of each pyramid is shown in FIG. 3 at 44 and 46. For the moment, it suffices to say that this arrangement of pyramid microprisms may be constructed of any suitable material such as acrylic glass or polycarbonate having the same or approximately the same index of refraction as the light pipe 14. Arrangement 36 may be a separately made, distinct arrangement from the light pipe, for example in the form of a separate sheet having a convex pyramid-featured underside 47, as illustrated in FIG. 3, in which case the arrangement could be readily bonded to the bottom surface 26 of the light pipe by means of suitable adhesive having the appropriate index of refraction so as to be transparent to light passing between the light pipe and micropyramids. On the other hand, as illustrated in FIG. 3, the arrangement of pyramid microprisms could be made as an integral part of the light pipe. In either case, the size of the pyramid microprisms and the height of the light pipe sections have been exaggerated in order to more fully understand the way in which they act upon light introduced into the light pipe. In the particular embodiment illustrated in FIG. 3, each regular pyramid defines a prism angle of 100° between opposing light reflecting sides. It is to be understood that the present invention is not limited to these particular physical parameters. The width and the length of the pyramid may also have different values and the angles in the x and y directions may also have different values. In addition, the two angles in x direction and/or the two angles in the y direction that the surfaces of the pyramids make with the base plane may have different values so that each of the four triangular surfaces of the pyramid may not be isosceles, as illustrated in FIG. 9B. As will be discussed, it may also be desirable to have the angles vary systematically in the x-y plane to make the output light propagating in a more desirable direction. The pyramid microprism sheet can be coated with aluminum or other suitable materials on the outer surface of the convex pyramids for enhanced reflection.

As will be seen hereinafter, as light is introduced into the light pipe at its entry end 16, for example, by means of arrangement 28, light is reflected upwards through top surface 24 in the direction of liquid crystal display 12, as indicated generally by means of arrows 38. As will also be seen, this arrangement of pyramid microprisms and arrangements 28, 28' can be designed to cooperate with one another so as to ensure that the light 38 exiting the light pipe through surface 24 does so in a highly collimated manner.

Still referring to FIG. 1, overall arrangements 28 and 28' for introducing light into the light pipe through its ends 16 and 20, respectively will now be described in more detail. Since the working principle of both arrangements are identical, the following description is with reference to arrangement 28 only.

Figure 2:
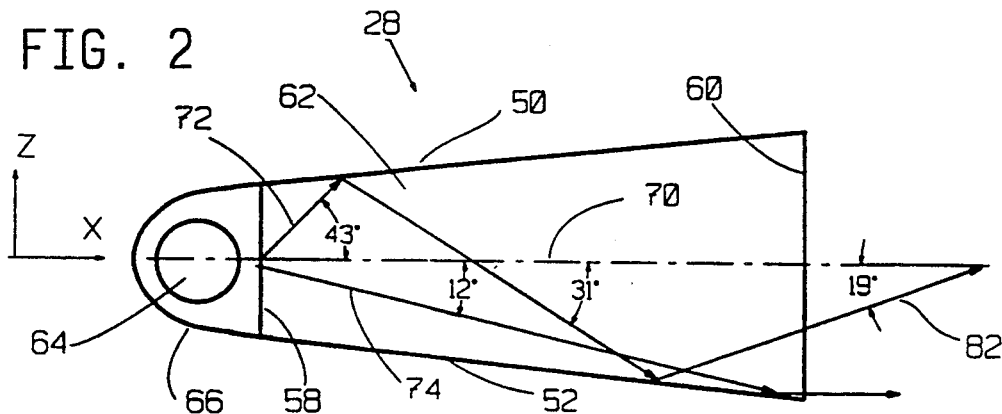
FIG. 2 if a sectional view of a light directing assembly, taken in x-z plane.

Turning now to FIG. 2, the light source 64 and its associated fixture 66 is shown in the x-z plane. The arrangement 28 includes a reflection prism 62 extending parallel to the entry side 16 of the light pipe. The prism 62 has opposing top and bottom surfaces 50 and 52, and opposite ends 58, 60. Light entering the prism in the x-z plane has a maximum divergence angle (the angle of the entering light with respect to the x-axis 70) which is determined by the index of refraction of the material that the prism is made of (about 43° if the prism is made of acrylic glass). As will be discussed hereinafter, it is important to keep the divergence angles of light in the x-z plane which enters the backlighting light pipe section 14 to at most a certain maximum angle. If light is allowed to propagate down the light directing assembly and into the backlighting light pipe at angles greater than this maximum angle, the backlight output 38 will not have the desired uniformity in distribution of light intensity to be suitable for application in LCD backlighting. At the entry end 58 of arrangement 28, the maximum divergence angle of light is approximately equal to arcs in $(n_1/n_2)$, where $n_1$ and $n_2$ are refractive indices of air and the collimating prism. When acrylic glass is used for the collimating prism, this maximum angle of divergence is 43°, as indicated above. Since light exiting the light directing assembly 28 and entering the light pipe 14 at large divergent angles will, generally, hit microprisms located at the bottom surface of the light pipe along sections close to the light source and will therefore give non-uniform intensity distribution of backlighting, it is important to keep the maximum divergence angle sufficiently small to achieve uniform backlighting intensity. For arrangement 28 to collimate light to within a desired maximum divergence range for delivery to the light pipe, for example, ±20°, the top and bottom surfaces 50 and 52 are constructed at a tilted angle, for example about 6°, with respect to the x-axis, as illustrated in FIG. 2.

As an example, light ray 72, which enters the reflection prism 62 at a divergence angle of 43° with respect to the x-axis, will be reflected by the top surface 50 and then the bottom surface 52 of the reflection prism. With each reflection, the light ray will have its divergence angle decreased by 12° for a 6° tilted surface. As a result, the light ray 82 leaving collimating arrangement 28 and entering the light pipe will do so at a divergence angle of 19° which is within the desired maximum delivery divergence range of ±20°. However, light rays, such as ray 74, which has a smaller initial divergence angle, for example 12°, will be reflected by the surface of the collimating light pipe only once within the entire light collimating assembly and will have its divergence angle decreased by 12°. In addition, light with divergence angle less than 6° will not hit either surface 50 and 52 but rather propagate through the collimating assembly with its direction unchanged. With a properly constructed collimating assembly, light rays with initial divergence angle greater than 32° will be reflected by surfaces 50 and 52, and will have their divergence angles decreased by a total of 24° before exiting the collimating arrangement 28. Light rays with initial divergence angles greater than 11° but smaller than 32° will be reflected at least once by either surface 50 or 52 and will have their divergence angles decreased by at least 12°. Light rays with initial divergence angles smaller than 11° may be reflected by one of the surfaces 50 or 52 at most once. Since all changes in propagation direction are a result of total internal reflection, there is no loss in light intensity.

The same principle just described with respect to arrangement 28 is applicable to light rays entering the arrangement 28' in the y-z plane.

Having described the way in which light from source 64 as well 64' is directed into the light pipe 14 by means of the light directing assemblies 28 and 28', attention is now directed to the way in which backlighting light pipe 14 in cooperation with pyramid microprism arrangement 36 acts on the input light to provide output backlighting 38. To this end, reference is directed to FIG. 3 which gives a cross sectional view of light pipe 14 in the x-z plane. Since light propagating in the y-z plane is similar to light propagating in the x-z plan, because of the symmetry in the arrangement of pyramid microprisms, the following discussion also applies to light from light directing assembly 28' propagating in the y-z plane. For purpose of this discussion, it will be assumed that the maximum divergence angle at which light enters the backlighting light pipe is ±20°, as depicted in FIG. 3. In the particular embodiment illustrated in FIG. 3, each of the regular pyramids defines an angle of 100° between adjacent pyramids.

Still referring to FIG. 3, note specifically the incoming light beam 76 which deviates by −20° from the x-axis will be bent by one surface of a pyramid and then propagate in the direction 78 which deviates by +10° from the normal 80. Light beam 82 which propagates nearly parallel to the x-axis will be bent by 80° and propagate in the direction 84 which deviates by −10° from the normal to surface 24. Light beam 86 which initially deviates by +20° from the x-axis will hit the underside of top surface 24 and then propagate downwards whereupon it will be reflected by one surface of a pyramid in a way similar to light beam 76, thereby propagating upward at an angle of +10° with the normal as indicated at 87. This process happens to all light beams making a positive angle with the x-axis. Similarly, light beams propagating in the opposite direction will also propagate outward with a divergence of ±10° reflecting off a micropyramid. As a result, all of the light beams exiting the light pipe through top surface 24 in the x-z plane will be collimated to one-half their original divergent angles, that is, one-half the angles at which light enters the light pipe 14.

In the particular example just described in conjunction with FIG. 3, it was assumed that the pyramids 42 define angles 100° between adjacent pyramids and that the incoming light does so within a divergence zone of ±20° with respect to the x-axis. For the purpose of coupling light into a light pipe, the pyramid array should have an angle determined by the allowed divergence angle and the index of refraction of the light pipe. The pyramid arrays should have pyramid angles roughly equal to 90° plus the allowed divergence angle. For practical use, there is no restriction on the size and repeat distance of the pyramids as long as they can be conveniently manufactured, with the repeating distance smaller than the minimum resolving distance of human eyes, and can be properly applied for backlighting. Nevertheless, it would be wise not to chose pyramid repeat distances close to the length of the pitches of a liquid crystal display, or their multiples, or dividers so that systematic effects on interference may be avoided.

Figure 4:
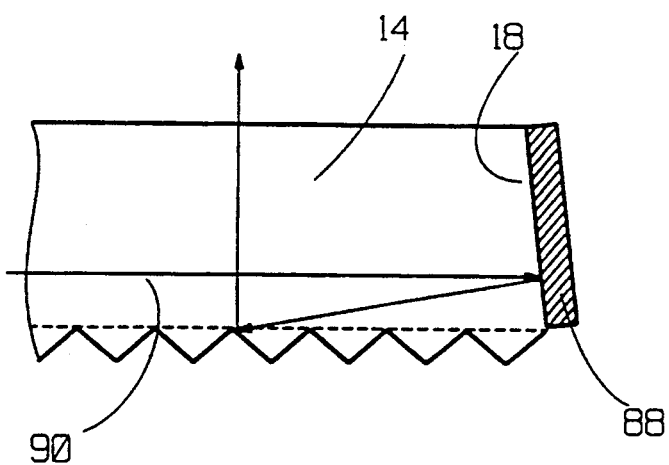
FIG. 4 is a sectional view of an end of the backlighting assembly of FIG. 1, especially illustrating the way in which light is reflected by an end mirror.

Now turning to FIG. 4, which illustrates the light pipe end 18 with a reflection mirror layer 88 attached. A similar mirror layer is provided at end or side 22, although not shown in the figures. Since the light entering the light pipe 14 is collimated, a part of the light can propagate through the entire light pipe without interaction with pyramid microprisms and reach the far end 18 (as well end 22). The mirror layer 88 is intended to turn the light rays like ray 90 back to prevent them from leaking out as well as to improve uniformity of backlighting. Note that the mirror layer is slightly tilted toward the micropyramids. As a result, incident light rays such as ray 90 which propagate almost parallel to the x-axis will be bent downwards after reflection by the mirror. In this way, light 38 exiting the light pipe does so more uniformly over the entire backlighting area, since otherwise more light 38 tends to leave the light pipe nearer to the ends 16 and 20 which are closer to the light sources than the ends 18 and 22 which are further away from the light sources.

Figure 5:
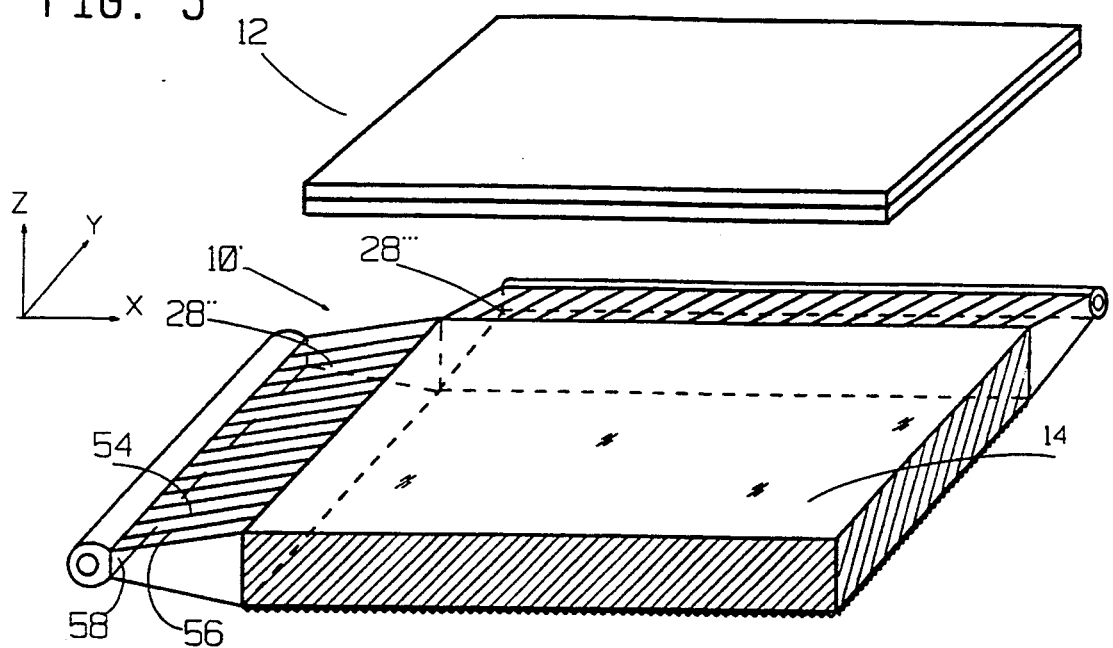
FIG. 5 is a perspective view of a backlighting assembly designed in accordances with another embodiment of the present invention.

In the backlighting assembly 10 described in conjunction with FIG. 1, the output light 38 is provided for backlighting LCD displays which do not need highly collimated illumination and therefore require no special means to achieve collimation of output light in both the x and y directions. On the other hand, as described previously, in order to backlight some stacked liquid crystal displays, a highly collimated output light is desired. FIG. 5 illustrates a backlighting assembly 10' designed to collimate output light in two dimensions. The assembly 10' has all of its components identical to that of assembly 10 with the exception of its light collimating assemblies 28'' and 28''' which differ somewhat from the corresponding light collimating assemblies 28 and 28'. Light collimating assembly 28'' and 28''' include the same outermost configuration as the corresponding light collimating assemblies 28 and 28'. However, the prism in each of the assemblies 28'' and 28''' is divided into a series of longitudinally extending laterally adjacent sections or channels which extend from the input end of its light directing assembly to its output end and which are optically isolated from one another along substantially their entire lengths, whereby the individual channels or sections act on incoming light substantially independent of one another. The collimating process inside the individual light directing channels will be described in detail. Again, since both assemblies 28'' and 28''' are constructed in the same way, the following description is referred to assembly 28'' only.

Figure 6A:
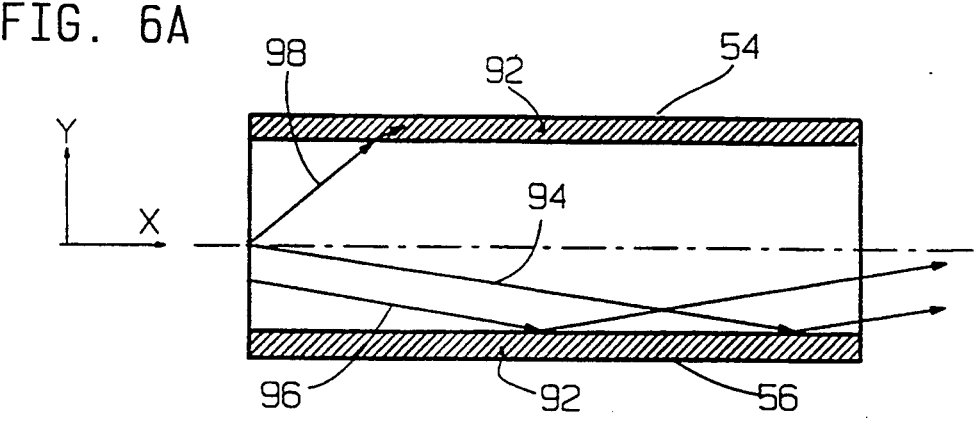
FIG. 6A is a sectional view of a light directing channel which forms part of a multichannel light directing segment of the backlighting assembly in FIG. 5, taken in the x-y planes, respectively.

For light rays in the x-z plane, collimating process inside light collimating assembly 28'' is identical to that of assembly 28, as illustrated in FIG. 2. As is described earlier, the top and the bottom surfaces 50 and 52 of each light directing section 62 is constructed with a certain tilt angle to accomplish collimating in the x-z plane, as illustrated in FIG. 2. However, in the assembly 28'', the multi-channel light pipe configuration provides in addition the ability of collimating light in the x-y plane. Attention is now directed to the way in which the light enters each of these individual light directing sections in the x-y plane, as is illustrated in FIG. 6A. In this plane, as in the x-z plane, light will enter the collimating assembly at the entrance end 58 with a divergent angle determined by the index of refraction of the material that the collimating assembly is made of. This maximum divergent angle, 43° if the collimating assembly is made of acrylic, is usually much greater than the tolerable maximum angle. In order to reduce the maximum divergent angle, opposing sides 54 and 56 of each light collimating section include appropriate coating 92, for example, for limiting the critical angle of total internal reflection within the light directing sections to the value of the desired maximum divergent angle, discussed in conjunction with FIG. 2. Thus, the light rays entering each light collimating section within the allowed divergence angle, for example rays 94 and 96, will be reflected by total internal reflection from the surface with coating 92, passing through the collimating section without loss in intensity. On the other hand, light rays entering each light directing section at angles outside the desired divergence angle, for example light ray 98, will be transmitted into the coating layer 92, reaching the painted outer surface of the coating and being absorbed there. As a result, substantially all of the light that propagates across each light collimating section will be collimated in the x-y plane to the desired degree of collimation. The maximum divergence angle, below which a light ray can pass through the collimating section without any loss, is determined by 90°-arcs in $(n_1/n_2)$, where $n_1$ and $n_2$ are refractive indices of coating 92 and the prism 62. In the case of the exemplified coating 92, specifically an epoxy of $n_1 = 1.45$, in combination with an acrylic prism 62, the maximum divergence angle is ±13°.

In the assembly 10' in FIG. 5, the arrangement 28''' is constructed in the same way as the arrangement 28''. Having the light field collimated inside the light pipe, the micropyramids arrangement 36 will act in the same way described earlier, as illustrated in FIG. 3, to provide collimated backlighting 38.

Figure 6B:
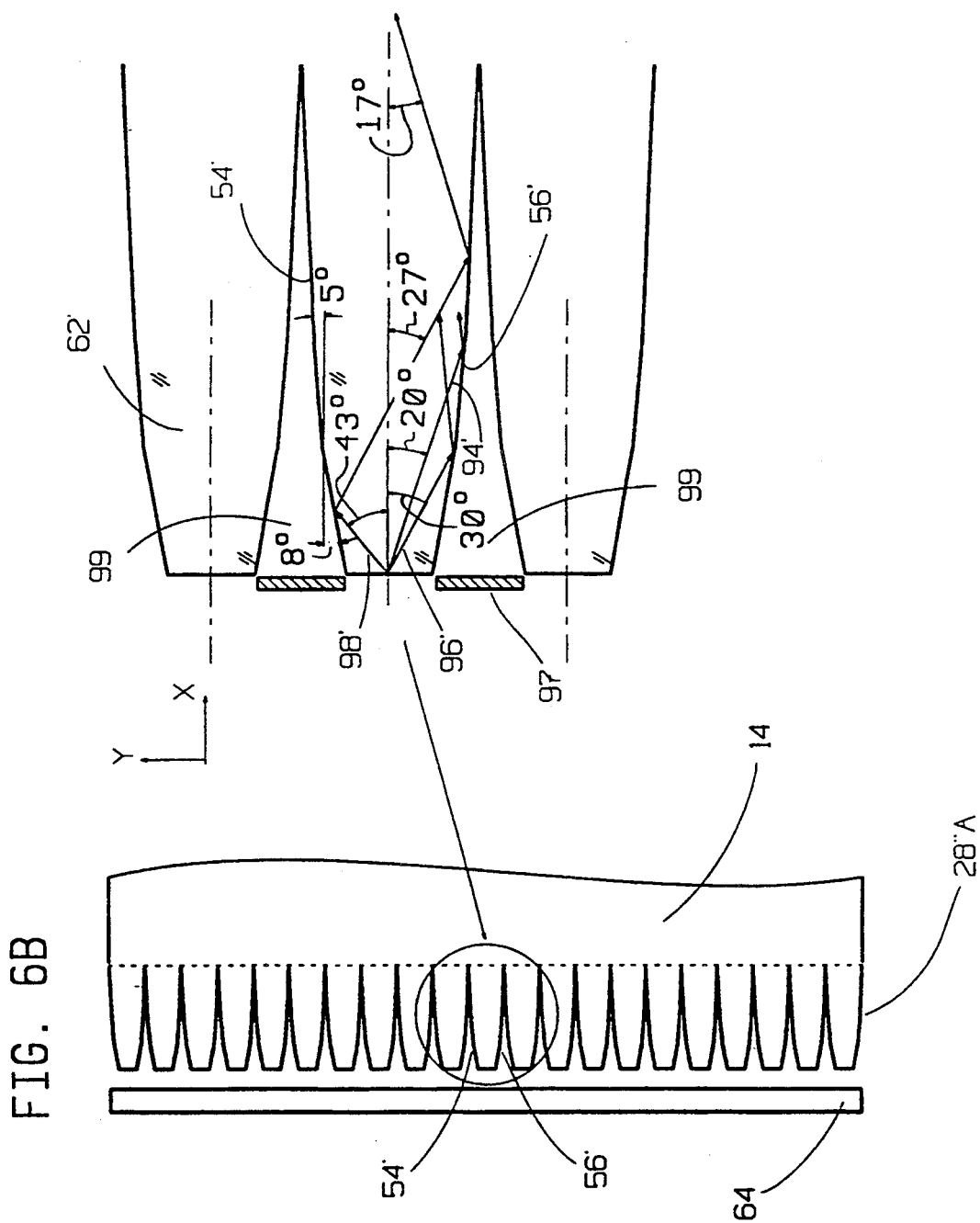
FIG. 6B is a sectional view of a multichannel light directing segment which consists of a row of pyramid prisms with flat ends designed in accordance with another embodiment of the present invention.

FIG. 6B shows another embodiment which can also provide output light collimated to a certain degree in both dimensions (x-z and x-y). In this embodiment, the multichannel light directing segment consists of a row of pyramid prisms 62' placed side by side. With the light collimating mechanism in the x-y plane identical to that in the x-z plane discussed before, light can be collimated by multiple reflection before entering the backlighting light pipe 14. In this embodiment, shields should be used in the spacings of the pyramids to ensure that light enters the prisms only at the ends facing the light source 64, so that the maximum divergence angle of light entering the prisms is determined only by the total internal reflection, an angle of 43° for acrylic with respect to the x-axis. Suitable shields would include light opaque or reflecting material 97 filling or shielding the spaces 99 illustrated in FIG. 6B. The light source may also be partially coated with a reflector on sections facing spaces 99 to shield light and to enhance the efficiency of the system.

Figure 7A:
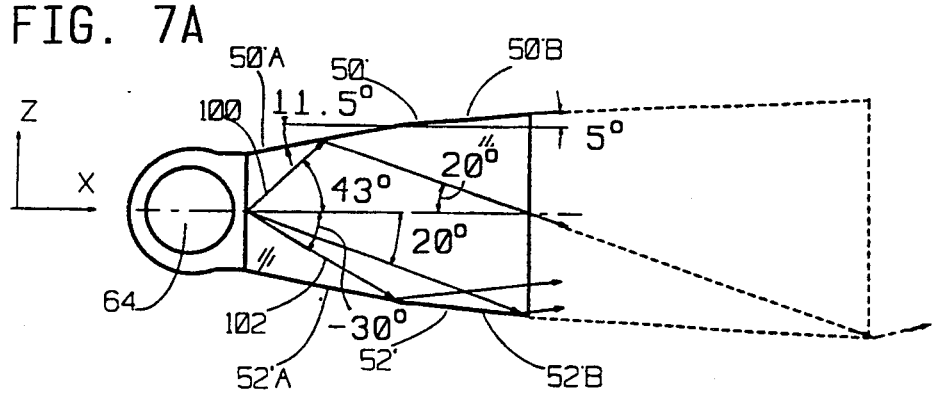
FIGS. 7A, 7B, and 7C are sectional views of light directing or light collimating assemblies in accordance with still other embodiments of the present invention.

FIG. 7A shows another embodiment of a light directing or collimating arrangement designed in accordance with the present invention. In this embodiment, each of the top and the bottom surfaces 50', 52' of the light directing arrangement has two sections 50'A, 50'B and 52'A and 52'B, each with a different slope. Since light with larger divergence angles will hit the top/bottom surfaces of the light directing arrangement at points closer to entry end, larger slopes near the entrance end will be more effective in correcting rays with larger divergence angles. In the particular embodiment illustrated in FIG. 7A, sections 50'A and 52'A of surfaces 50' and 52' are tilted by 11.5°, while sections 50'B and 52'B are tilted by only 5°. Light rays, like 100, 102 with initial divergence angle equal to or larger than 30° will fall within a desired divergence angle, for example 20°, after only one reflection, and can be further corrected in its propagating direction by a second reflection of an extended reflection surface, as indicated by dotted line in FIG. 7A, if an even smaller divergence angle is desired. As compared to the structure with only one slope, shown in FIG. 2, the light directing assembly according to the embodiment in FIG. 7A is more compact in size and more efficient in collimating light. The number of sections with various tilt angles may be properly chosen to satisfy the required illumination characteristics of a particular light source and the desired degree of collimating. In addition, light collimating prisms with curved surfaces can also be used to achieve a required degree of collimation. Also, depending on limitations in shape and size of available space for a backlighting assembly, the configuration of a light directing arrangement can be specifically designed. If an available space is more limited in thickness (that is, in the z-direction) than in area (that is, in the x-y plane), the light directing arrangement should have less tilted and more extended reflection surfaces composed of fewer sections with different tilt angles. If the converse is true, the light directing arrangement should have less extended reflection surfaces composed of more sections with various tilt angles.

Figure 7B:
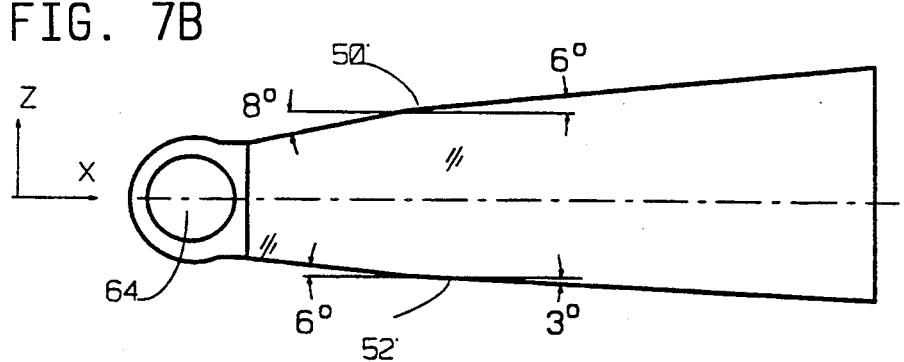

It may also be desirable to provide the top surface of the light collimating assembly with a slope which is greater than that of the bottom surface, as shown in FIG. 7B. This configuration with the top surface having a greater slope than that of the bottom surface will place the light source at a somewhat "lower position" with respect to the microprisms located on the bottom surface of the light pipe, and will therefore give light rays which reach the microprisms from the light source directly, a smaller deviation angle with respect to the x-y plane. This arrangement will give a more evenly distributed output light intensity over the whole light pipe surface for backlighting.

Figure 7C:
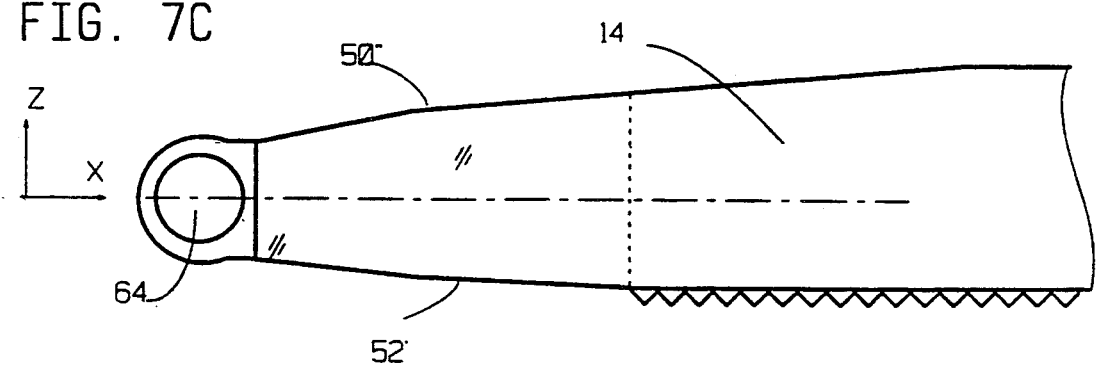

As is shown in FIG. 7C, the top slope 50'' of the light collimating prism may extend into the top surface of the light pipe 14 to minimize the size of the backlighting system.

Figure 8:
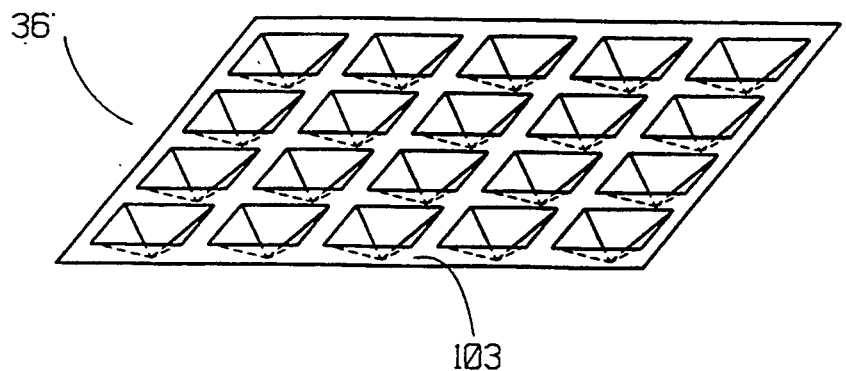
FIG. 8 is a diagrammatic illustration, in perspective view, of a portion of a modified sheet of pyramid microprisms for use as part of the backlighting assembly of FIG. 1.

FIG. 8 shows a modified arrangement 36' of pyramid microprisms which can be viewed as a configuration with the uppermost edges of adjoining pyramids removed to form plateaus therebetween. These plateaus, indicated at 103, are parallel to the top surface 24 of the light pipe 14, and in cooperation with the top surface 24, serve as means for guiding light rays to areas further away from the light source, and therefore achieve more evenly distributed output of light. FIG. 9A depicts two light rays 104, 106 which enter the light pipe at a relatively large divergence angle. Light ray 104 will be coupled out of the light pipe once it hits the light reflecting side of one of the pyramids in the same manner as the un-modified version of FIG. 3. However, light ray 106, which in the unmodified version would have been coupled out or the light pipe adjacent to light ray 104, as indicated by dashed line, is now reflected by a plateau 103 and coupled out of the backlighting light pipe a further distance from the light source. With this approach, a more evenly distributed output light intensity for backlighting can be achieved. The size of plateaus may have a position-dependent variation to achieve the most uniform illumination. See for example FIG. 9B where the plateaus first decrease in size from the light source end of the backlighting assembly to its opposite end and then increase as indicated at 103a, 103b, 103c and 103d. These plateaus may each make an angle with respect to the top surface to further improve the collimation of light within the light pipe.

As was described before, light rays with large deviation angles will hit the bottom surface of the light pipe more rapidly and will therefore tend to be coupled out of the light pipe in sections closer to the light source. On the other hand, light rays with smaller deviation angles can propagate a longer distance before hitting the bottom of the light pipe and be coupled out of the light pipe in sections farther away from the light source. Light rays with sufficiently small deviation angles will hit the bottom of the light pipe only after being reflected by the inclined end surface 18 (see FIG. 4). As a result, the deviation angle the output light will have a systematic variation over the extension of the light pipe if all microprisms are made identical. To achieve a more desirable distribution in the deviation angle of the output light, the angles which the surfaces of the microprisms make with the base plane should be properly designed to vary systematically along the light pipe extension, as is indicated in FIG. 9B. It is to be understood that these various angle and position deviations of the pyramid prisms are equally applicable to the triangle prisms described in the parent application, and also those illustrated in FIGS. 12A and 12B.

Figure 10:
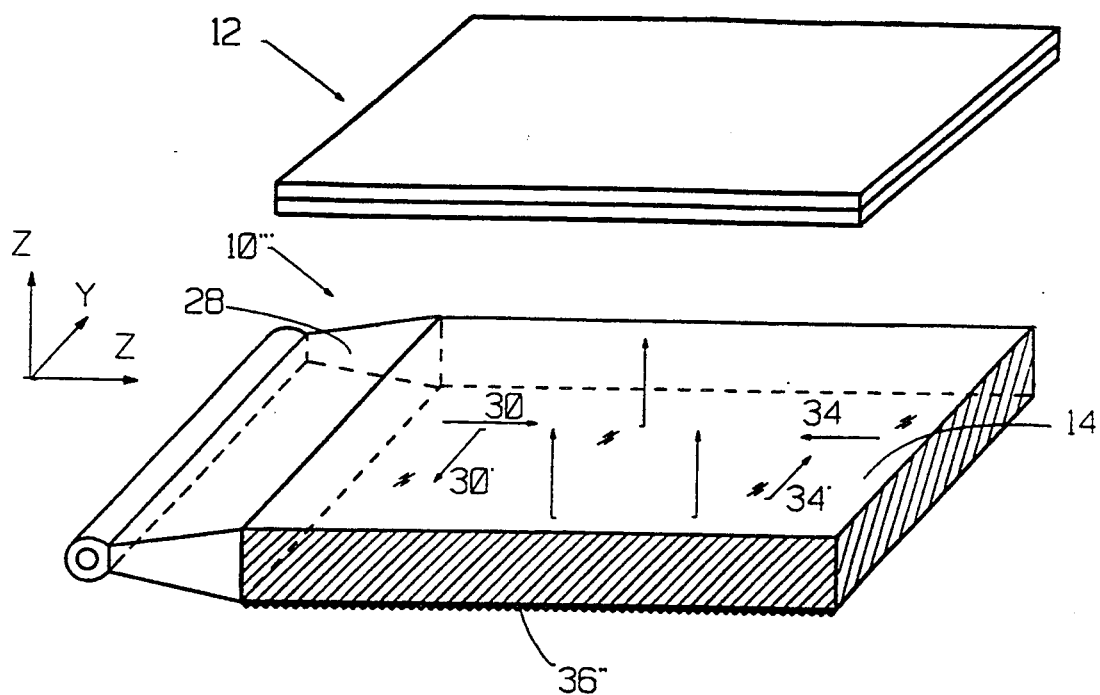
FIG. 10 is a perspective view of a backlighting assembly designed in accordance with still another embodiment of the present invention.
Figure 11:
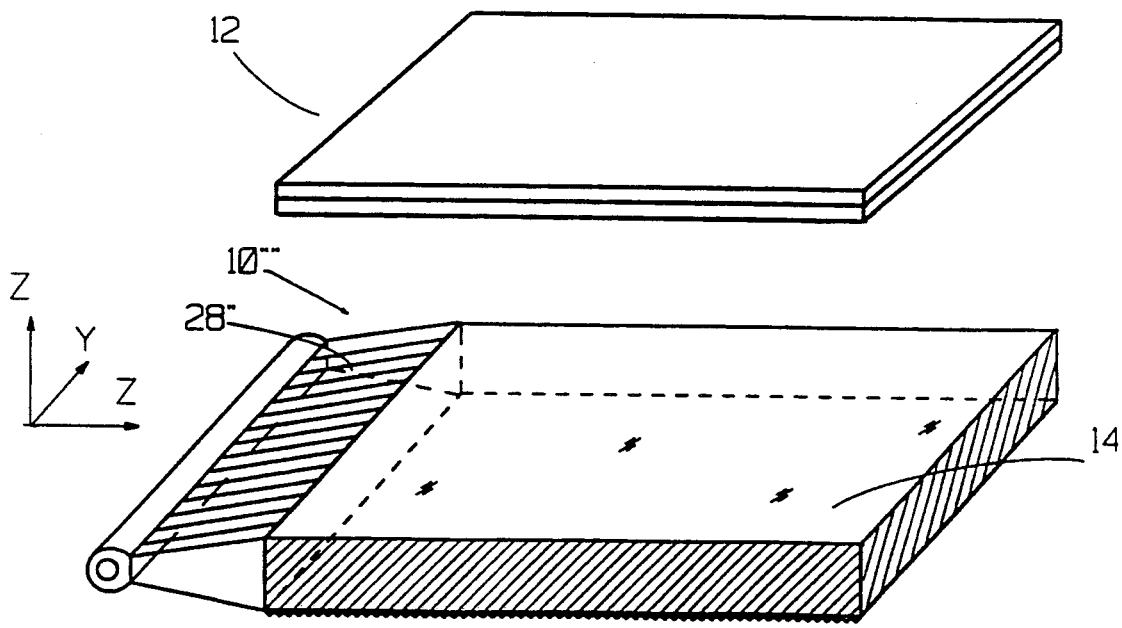
FIG. 11 is a perspective view of a backlighting assembly designed in accordance with a further embodiment of the present invention.
Figure 12A:
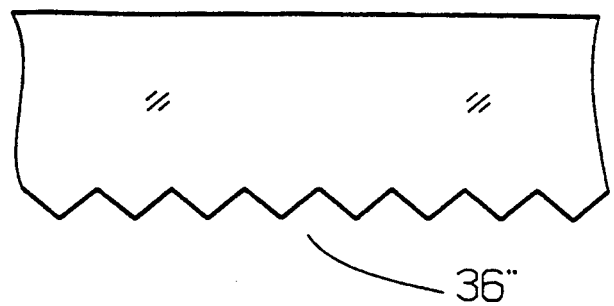
FIG. 12A is a diagrammatic illustration, in perspective view, of a portion of a sheet of microprisms in accordance with still further embodiment of the present invention.
Figure 12B:
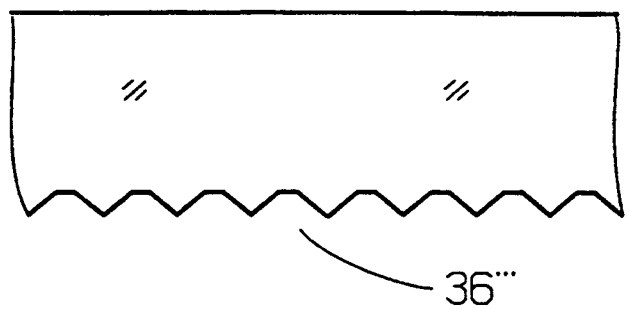
FIG. 12B is a diagrammatic illustration, in perspective view, of a portion of a modified version of the microprism sheet of FIG. 12A.

Many of the previously described features of the present invention can also be applied to a backlighting assembly which employs only one light source. FIG. 10 illustrates such a backlighting assembly 10''' which efficiently provides high intensity backlighting. FIG. 11 illustrates a modified version of backlighting assembly 10''', specifically an assembly 10'''', which provides collimated backlighting. In both of these embodiments, most components have the same configuration as embodiments 10, 10', except for the use of a single light source in each case. Also, in each of these latter embodiments, the pyramid microprisms may be replaced with triangle microprisms configured in the manner of the parent application, as shown in FIG. 12A, for one dimensional light output coupling since light rays enters the light pipe 14 from only one side. As is shown in FIG. 12B, the top edge of the triangle microprisms may also be modified forming a plateau to achieve an even more uniform distribution of backlighting intensity. The plateaus may each also make an angle with the top surface of the backlighting light pipe. Furthermore, since light inside the light pipe is collimated, say to within ±20°, no light rays will reach the bottom tip region of the microprisms. As a result, the tip structure of the microprisms is not essential and may be either rounded or removed without affecting the performance of the backlighting system.

As is known, in most LCD operations, linearly polarized light is needed. In the typical case, a polarizer which is transparent to light polarized in a particular direction only is used to obtain that polarized light. However, using this standard approach, less than half of the natural light is transmitted through the polarizer as linearly polarized light of a given polarity because the other half, light polarized with the opposite polarity, is rejected or absorbed by the polarizer. As will be described hereinafter, an LCD system which requires polarized light and which utilizes a backlighting assembly of the types previously described is disclosed herein. However, as will also be seen, this particular system differs from prior art systems in that substantially all of the light from the backlighting assembly is polarized in the right direction and therefore usable in substantially its entirety by the liquid crystal display. To this end, the system to be described utilizes a known retroreflecting sheet polarizer of the type described in the publication entitled RETROREFLECTING SHEET POLARIZER by M. F. Weber in SID 92 Digest, page 427–429.

Figure 13:
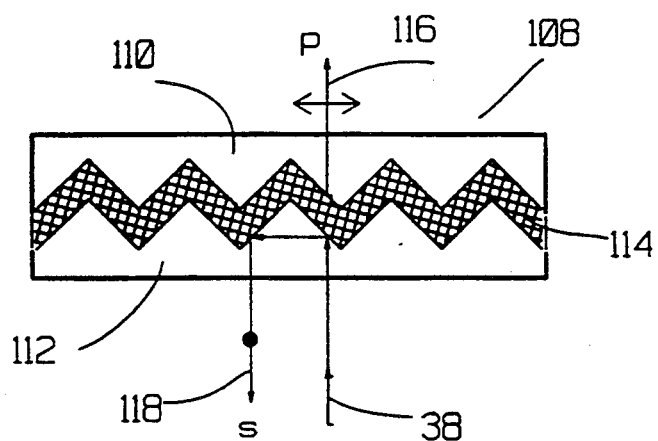
FIG. 13 is a diagrammatic illustration, in side elevation, of a retroreflecting sheet polarizer.

The retroreflecting sheet polarizer referred to immediately above is illustrated in FIG. 13 and generally designated by the reference number 108. This particular device is constructed by using two 90° triangle microprism sheets, an upper sheet 110 and a lower sheet 112 which are spaced apart in the manner shown in FIG. 13. These sheets, actually two Scotch Optical Lighting Film (SOLF films), as recited in the Weber publication, are joined by an optical adhesive after thin optical layers 114 are deposited on one or both of the mating microstructured surfaces. The refractive indices of neighboring layers are so selected that the normal incidence with respect to the bottom prisms 112 is just under the brewster angle for the optical layer 114. As illustrated in FIG. 13, backlight 38 entering the polarizer results in the passage of p-polarized light 116, which is polarized in the plane of incidence containing the normal of the layer and the incident light, while s-polarized light 118, which is polarized perpendicular to the plane of incidence, is twice reflected for a 180° reversal of direction.

Figure 14:
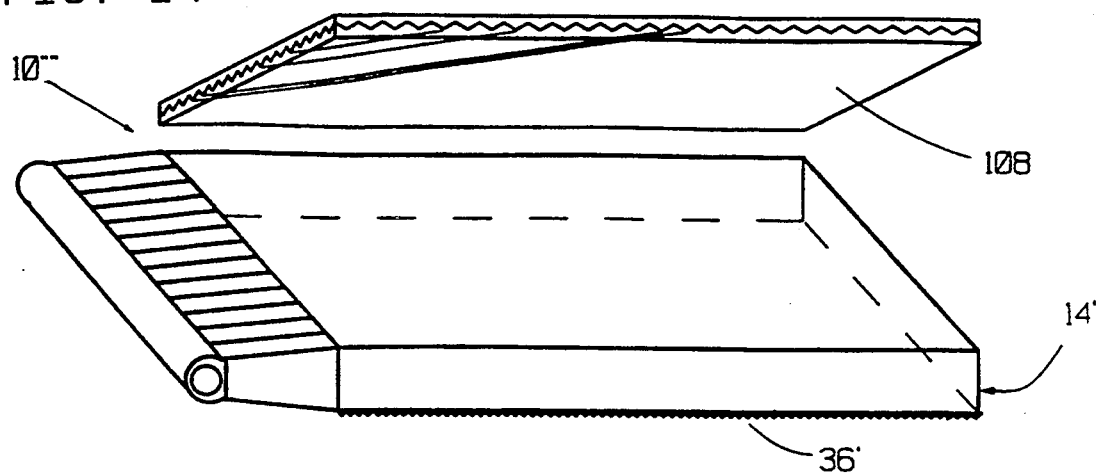
FIG. 14 is a perspective view illustrating the combination of the backlighting assembly of FIG. 1 and the retroreflecting sheet polarizer of FIG. 13.

Having described retroreflecting sheet polarizer 108, attention is now directed to the way it is used in combination with one of the previously described backlighting assembly in an overall liquid crystal display system. The combination of polarizer 108 and backlighting assembly 10'''' is depicted in FIG. 14. As seen there, the polarizer is shown for purposes of description directly over and skewed upward above the top surface of light pipe 14' forming part of assembly 10''''. In actual practice the polarizer is disposed in parallel confronting relationship with the top surface of light pipe 14' immediately below a cooperating liquid crystal display. In the particular embodiment illustrated, also for convenience of explanation, the microprisms forming part of the polarizer extend at 45° angle with the extension direction of the microprism 42' forming part of microprism arrangement 36''.

Figure 15:
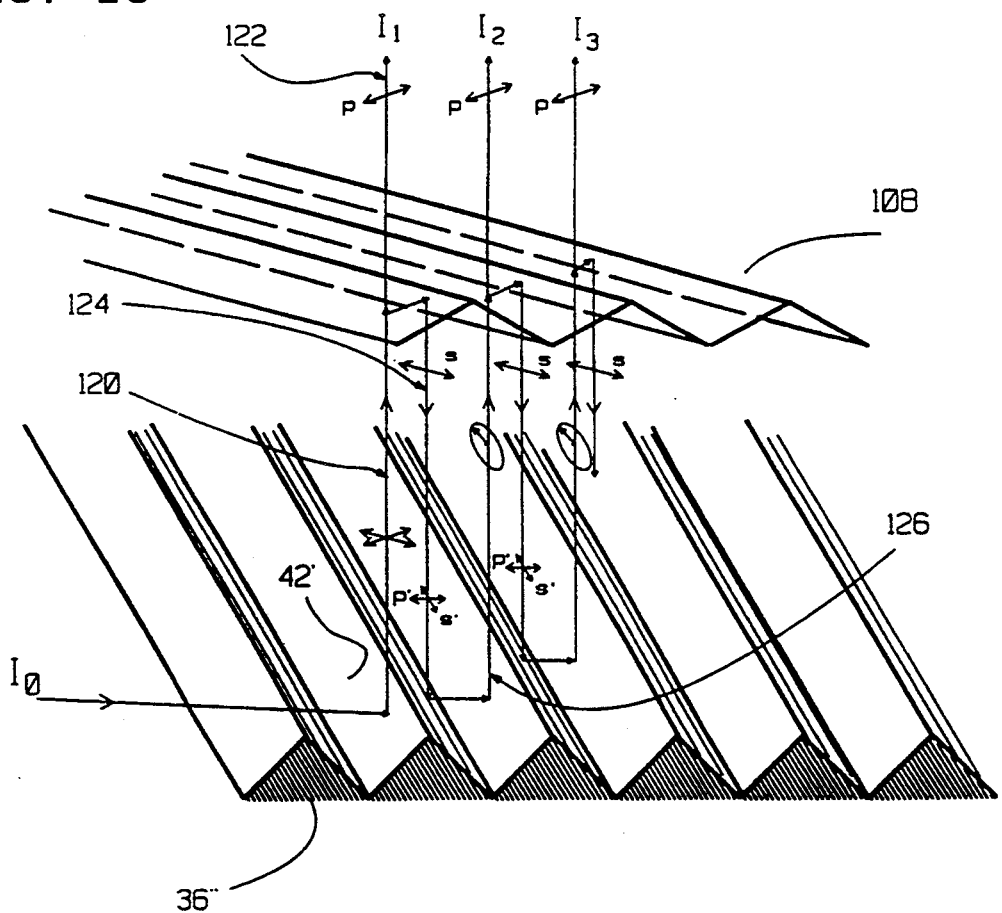
FIG. 15 diagrammatically illustrates the way in which an arrangement of microprisms forming part of the backlighting assembly of FIG. 14 cooperates with an arrangement of the retroreflecting sheet polarizer of FIG. 13 in order to polarize light in accordance with the present invention.
Figure 16:
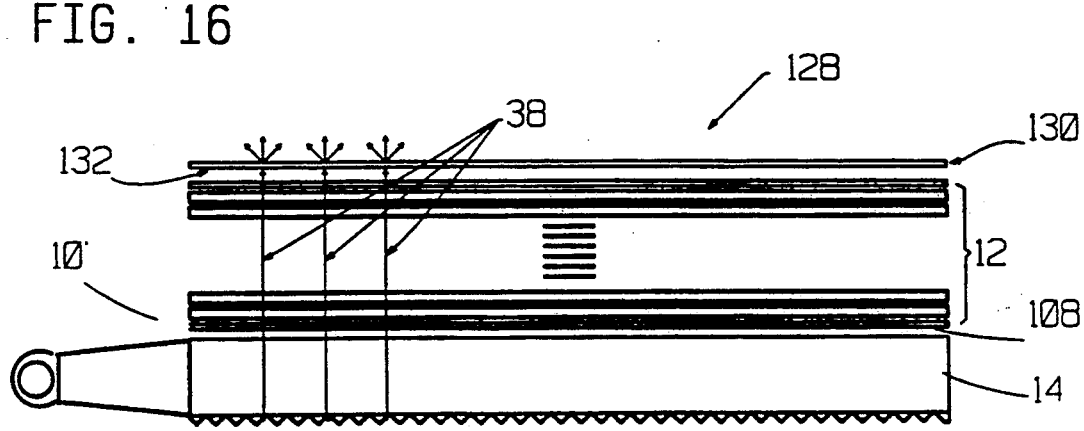
FIG. 16 is a diagrammatic illustration, in side elevational view, of an overall liquid crystal display system including a liquid crystal display assembly, a backlighting assembly designed in accordance with the present invention, a polarizing arrangement which, in combination with the backlighting assembly, is designed in accordance with the present invention, and a light scattering diffusing plate.

As shown in FIG. 15, a light ray 120 is carried to reflect upwards and out of the light pipe 14' from a cooperating microprism 42' propagating upward in a plane (x-z or y-z plane) perpendicular to the bottom surface of the polarizer 108. Assuming 50 percent of the light has the right polarization to be transmitted as indicated as p-polarized light 122 in FIG. 14, the component of light with the wrong polarization (indicated as s-polarized 124) will be reflected by 180° and will propagate toward the prism arrangement 36''. However, since the prism arrangement 36'' extends at a 45° angle with that of the polarizer, the reflected beam, which is s-polarized for the polarizer, is not s-polarized for the arrangement 36''. For this arrangement, the backwards reflected polarized light is decomposed again into p and s component for the prisms 42', as indicated at p' and s' in FIG. 15. Each component will have its phase angle changed by $\theta_p$ and $\theta_s$, respectively, after reflection at the surfaces on the prism. With the materials used, $2\theta_p - 2\theta_s$ (2 accounts for twice internal reflections shown in the diagram) has a value close to 90° and the light beam reflected toward the polarizer 108 becomes nearly circularly polarized light. Now the circularly polarized light 126, just like the unpolarized light 120, will have equal amounts of s and p components for the polarizer. As a result, 50% of the circularly polarized light will be transmitted through the polarizer again as p-polarized light, and the other half will be reflected as s-polarized light back toward the microprism arrangement 36''. This process will be repeated, and the total light transmitted through the polarizer is therefore $I_1 + I_2 + I_3 + \ldots = I_0$, where $I_0$ is the light initially entering the light pipe 14'. Although in reality losses will occur in each reflection, and the efficiency of conversion for unpolarized light will therefore be somewhat smaller than the theoretical ideal value of 100%, gains in the conversion efficiency can still be close to a factor of 2. Here, it should also be noted that collimation in only one dimension is needed for the above mechanism to work. However, modified microprisms/micropyramids will not work efficiently for converting natural light into polarized light with the above mechanism. Enhancement of the brightness of the LCDs by converting all of the unpolarized light to the desired polarization can be achieved for both the microprism arrangement 36'' and micropyramids arrangement 36 as long as the transmission axis of a retroreflecting polarizer is neither parallel nor perpendicular to the extension of microprisms or either base of micropyramids. Turning now to FIG. 16, attention is directed to an overall LCD system which is generally indicated by the reference numeral 128. This system includes one of the previously described backlighting assembly, for example, backlighting assembly 10' in position directly under a liquid crystal display 12. In addition to these components, system 128 includes a piece of matte sheet glass or other light diffusing transparent sheet 130 placed on top of the liquid crystal cell 12 which is illuminated by backlighting assembly 10'. Since light 38 coming out of the backlighting assembly is highly collimated, an image of the picture displayed on the liquid crystal cell, or liquid crystal display cells in the case of stacked cell configuration, is formed on the scattering surface 132 of a diffuser sheet 130 just like real images formed by a projector on a screen. Light scatters from the diffuser surface and enters the viewers eye regardless of its angular position, thereby eliminating viewer angle sensitivity. The multiple reflection light collimating arrangement disclosed here may also be applied to all flat panel backlighting systems based on a light pipe, such as the faceted, parallel surface light pipe design of U.S. Pat. No. 5,050,946.

What is claimed is:

1. An assembly for backlighting a liquid crystal display, comprising:
   (a) a backlighting light pipe having opposing top and bottom surfaces which define the thickness of the light pipe, opposing sides which define its width, and opposite ends which define its length;
   (b) means for directing light into said light pipe and for causing it to move therethrough; and
   (c) an arrangement of immediately adjacent pyramid microprisms in rows extending normal to the lengthwise axis of the light pipe from one side of said light pipe to its opposing side along the entire extent of and serving as the bottom surface of the light pipe, each of said pyramid microprisms having its vertex extending downward from a rectangular base so as to define from said vertex first and second pairs of opposing, upwardly angled light reflecting surface segments for reflecting light within said light pipe upwards through its top surface in a generally collimated manner.

2. An assembly according to claim 1 wherein said means for directing light into said light pipe includes first light source means for directing light into said light pipe from one end thereof and for causing the light to move toward the opposite end and second light source means for directing light into said light pipe from one side thereof and for causing the light to move toward the opposite side.

3. An assembly according to claim 2 wherein said opposite end and said opposite side of said light pipe include light reflecting end and side surfaces facing said one end and said one side, respectively, whereby light entering said light pipe from said one end is ultimately reflected upwards by said first pair of light reflecting surface segments and light entering said light pipe from said one side is ultimately reflected upwards by said second pair of light reflecting surface segments.

4. An assembly according to claim 3 wherein each of said light reflecting end and side surfaces is angled slightly downward.

5. As assembly according to claim 1 wherein the bases of said pyramid microprisms in a common plane parallel to the top surface of said light pipe with the base of any given pyramid microprism being spaced from the bases of the adjacent pyramid microprisms by means of upwardly facing horizontal light reflecting surface segments.

6. As assembly according to claim 2 wherein said first light source means includes first means for limiting the maximum angle at which light enters said light pipe in relation to the lengthwise axis of the light pipe and wherein said second light source means includes second means for limiting the maximum angle at which light enters said light pipe in relation to the widthwise axis of the light pipe.

7. An assembly according to claim 6 wherein each of said first and second light angle limiting means includes a light collimating light pipe having opposing top and bottom surfaces which define its thickness, opposing sides which define its width and opposing rearward and forward ends which define its length, each of said light collimating light pipes being disposed in end-to-end relationship with and directly adjacent to the light entering end or side of said back lighting light pipe, the top and bottom surfaces of each light collimating light pipe tapering outward away from one another from its rearward end to its forward end.

8. An assembly according to claim 7 wherein each of the top and bottom tapering surfaces of each of said light collimating light pipes includes two lengthwise segments thereof which taper outward at different angles from one another.

9. An assembly according to claim 7 wherein each of said light collimating light pipes is divided into a series of longitudinally extending, laterally adjacent light pipe sections which are optically isolated from one another.

10. An assembly for backlighting a liquid crystal display, comprising:
    (a) a backlighting light pipe having opposing top and bottom surfaces which define the thickness of the light pipe, opposing sides which define its width, and opposite ends which define its length;
    (b) an arrangement of light reflecting surfaces along the entire extent of and serving as the bottom surface of the light pipe for reflecting light within said light pipe upwards through its top surface in a generally collimated manner; and
    (c) means for directing light into said light pipe from at least one end or one side thereof and for causing it to move from said one end or one side of the light pipe toward the opposite end or side thereof, said means for directing light into said light pipe including means for limiting the maximum angle at which light enters the light pipe in relation to the lengthwise and/or widthwise axis of the light pipe to an angle no greater than a predetermined angle, said light reflecting surfaces being configured such that the light entering said light pipe is reflected off the light reflecting surfaces toward the top surface of the light pipe at angles no greater than one-half said maximum angle with respect to lines normal to said top surface.

11. An assembly according to claim 10 wherein said light reflecting surfaces are defined by an arrangement of pyramid microprisms.

12. An assembly for backlighting a liquid crystal display, comprising:
    (a) a backlighting light pipe having opposing top and bottom surfaces which define the thickness of the light pipe, opposing sides which define its width, and opposite ends which define its length;

(b) an arrangement of pyramid microprisms extending along the entire extent of and serving as the bottom surface of the light pipe for reflecting light within said light pipe upwards through its top surface in a generally collimated manner; and (c) means for directing light into said light pipe from at least one end or side thereof and for causing it to move from said one end or side of the light pipe toward the opposite end or side thereof, said means for directing light into said light pipe including light control means for limiting the maximum angle at which light enters the light pipe in relation to the lengthwise axis of the light pipe.

13. A liquid crystal display assembly, comprising:
(a) a backlighting light pipe having opposing top and bottom surfaces and opposing sides and extending lengthwise between opposite ends;
(b) means for directing unpolarized light into said light pipe and for causing it to move from one end of the light pipe towards the opposite end thereof;
(c) an arrangement of pyramid microprisms serving as the bottom surface of the light pipe for reflecting light within said light pipe upwards through its top surface in a generally collimated manner;
(d) means for linearly polarizing in a given polarity direction the light directed out of said light pipe through the top surface thereof, said polarizing means including a polarization arrangement which cooperates with said arrangement of pyramid microprisms such that substantially all of the light directed out of said light pipe through the top surface thereof is linearly polarized in said given polarity direction, said polarizing means including a retroreflecting sheet polarizer containing a series of longitudinally extending, adjacent parallel triangle microprisms, said retroreflecting sheet polarizer being positionable in parallel relationship with and in front of the top surface of said light pipe such that said triangle microprisms extend in directions transverse but not perpendicular to the microprisms of said light pipe.

14. An assembly for backlighting a liquid crystal display, comprising:
(a) a backlighting light pipe having opposing top and bottom surfaces which define the thickness of the light pipe, opposing sides which define its width, and opposite ends which define its length;
(b) an arrangement of light reflecting surfaces extending along the entire extent of and serving as the bottom surface of the light pipe for reflecting light within said light pipe upwards through its top surface in a generally collimated manner; and
(c) means for directing light into said light pipe from at least one end or side thereof and for causing it to move from said one end or side of the light pipe toward the opposite end or side thereof, said means for directing light into said light pipe including light control means for limiting the maximum angle at which light enters the light pipe in relation to the lengthwise or widthwise axis of the light pipe, said light control means including a light collimating light pipe having opposing top and bottom surfaces which define its thickness, opposing sides which define its width, and opposite rearward and forward ends which define its length, said light collimating light pipe being disposed in end-to-end relationship directly adjacent to the light entering end or side of said back lighting light pipe, and said top and bottom surfaces of the light collimating light pipe tapering outward from its rearward end to its forward end.

15. An assembly according to claim 14 wherein each of the top and bottom tapering surfaces of said light collimating light pipes includes two lengthwise segments thereof which taper outward at different angles from one another.

16. An assembly according to claim 14 wherein said light collimating light pipe is divided into a series of longitudinally extending, laterally adjacent light collimating light pipe sections which are optically isolated from one another, and which include outwardly tapering top and bottom surfaces.

17. An assembly according to claim 16 wherein each of said light collimating light pipe sections includes opposite sides that taper outward from its rearward end to its forward end.

18. An assembly according to claim 17 wherein each of the tapering sides of each light collimating light pipe sections includes two lengthwise segments thereof which taper outwardly at different angles from one another.

19. An assembly according to claim 14 wherein the outwardly tapering top surface of said light collimating light pipe includes a forwardmost section that extends beyond the outwardly tapering bottom surface of the light collimating light pipe and forms part of the top surface of said backlighting light pipe.

20. An assembly for backlighting a liquid crystal display, comprising:
(a) a backlighting light pipe having opposing top and bottom surfaces which define the thickness of the light pipe, opposing sides which define its width, and opposite ends which define its length;
(b) light source means for directing light into said light pipe from one end or side thereof and for causing the light to move toward the opposite end or side, said light source means including means for limiting the maximum angle at which light enters said light pipe in relation to the lengthwise or widthwise axis of the light pipe, said light angle limiting means including light collimating light pipes, each having opposing top and bottom surfaces which define its thickness, opposing sides which define its width and opposing rearward and forward ends which define its length, said light collimating light pipes being disposed in end-to-end relationship with and directly adjacent to the light entering end or side of said back lighting light pipe, the top and bottom surfaces of each light collimating light pipe tapering outward away from one another from its rearward end to its forward end; and
(c) an arrangement of immediately adjacent light reflecting surfaces extending along the entire extent of and serving as the bottom surface of the light pipe for reflecting light within said light pipe upwards through its top surface in a generally collimated manner.

21. An assembly according to claim 20 wherein each of the top and bottom tapering surfaces of said light collimating light pipe includes two lengthwise segments thereof which taper outward at different angles from one another.

22. An assembly according to claim 20 wherein said light collimating light pipes have optical coatings and are optically isolated from one another.

23. An assembly for backlighting a liquid crystal display, comprising:
 (a) a backlighting light pipe having opposing top and bottom surfaces and opposing sides and extending lengthwise between opposite ends;
 (b) means for directing light into said light pipe and for causing it to move from one end of the light pipe towards the opposite end thereof; and
 (c) an arrangement of microprisms extending the entire extent of and serving as the bottom surface of the light pipe, each of said microprisms defining opposing, upwardly angled light reflecting surface segments for reflecting light within said light pipe upwards through its top surface in a generally collimated manner, said microprisms being spaced predetermined but varying distances from one another so as to define correspondingly varying flat, upwardly facing light reflecting surface segments between adjacent microprisms.

24. An assembly according to claim 23 wherein said flat upwardly facing surface segments define acute angles with the top surface of said backlighting pipe.

25. An assembly according to claim 23 wherein certain ones of said upwardly angles light reflecting surface segments extend upwardly at angles different from other ones of said segments.

26. An assembly according to claim 23 wherein said microprisms are triangle microprisms.

27. An assembly according to claim 23 wherein said microprisms are pyramid microprisms.

28. An assembly for backlighting a liquid crystal display, comprising:
 (a) a backlighting light pipe having opposing top and bottom surfaces which define the thickness of the light pipe, opposing sides which define its width, and opposite ends which define its length;
 (b) means for directing light into said light pipe and for causing it to move therethrough; and
 (c) an arrangement of immediately adjacent microprisms extending along the entire extent of and serving as the bottom surface of the light pipe, each of said microprisms extending downward to a bottom-most segment thereof in a direction away from the top surface of said backlighting light pipe so as to define from said bottom-most segment upwardly angled light reflecting surface segments for reflecting light within said light pipe upwards through its top surface in a generally collimated manner.

29. An assembly according to claim 28 wherein the bottom-most segment of each microprism is flat.

30. An assembly according to claim 28 wherein the bottom-most segment of each microprism is round.

* * * * *